United States Patent
Lee et al.

(10) Patent No.: US 7,632,892 B2
(45) Date of Patent: Dec. 15, 2009

(54) ACRYLIC COPOLYMER COMPOSITION, METHOD FOR PREPARING ACRYLIC COPOLYMER, AND VINYL CHLORIDE RESIN COMPOSITION CONTAINING THE ACRYLIC COPOLYMER

(75) Inventors: Yong-Hun Lee, Yeosu (KR); Jung-sup Han, Busan (KR); Hyung-Jun Son, Daegu (KR)

(73) Assignee: LG Chem, Ltd. (KR)

( * ) Notice: Subject to any disclaimer, the term of this patent is extended or adjusted under 35 U.S.C. 154(b) by 223 days.

(21) Appl. No.: 10/564,417

(22) PCT Filed: Sep. 3, 2004

(86) PCT No.: PCT/KR2004/002231

§ 371 (c)(1),
(2), (4) Date: Jan. 11, 2006

(87) PCT Pub. No.: WO2005/023882

PCT Pub. Date: Mar. 17, 2005

(65) Prior Publication Data

US 2006/0194926 A1    Aug. 31, 2006

(30) Foreign Application Priority Data

Sep. 4, 2003   (KR) .................... 10-2003-0061841

(51) Int. Cl.
*C08L 33/12* (2006.01)
*C08L 27/06* (2006.01)

(52) U.S. Cl. .................. 525/228; 525/222; 525/239; 525/309; 525/330.3

(58) Field of Classification Search ............... 525/222, 525/228, 239, 309, 330.3
See application file for complete search history.

(56) References Cited

U.S. PATENT DOCUMENTS

| | | | |
|---|---|---|---|
| 5,147,932 A | 9/1992 | Ilenda et al. | 525/71 |
| 5,563,227 A | 10/1996 | Kitaike et al. | 526/320 |
| 6,031,047 A | 2/2000 | Brady et al. | 525/64 |
| 6,140,417 A | 10/2000 | Nakanishi et al. | 525/85 |
| 6,221,966 B1 | 4/2001 | Nakanishi et al. | 525/228 |
| 6,309,739 B1 * | 10/2001 | Koizumi et al. | 428/220 |
| 6,391,976 B1 | 5/2002 | Naka et al. | 525/239 |

FOREIGN PATENT DOCUMENTS

| | | |
|---|---|---|
| EP | 0 897 954 | 2/1999 |
| EP | 1 111 001 | 6/2001 |
| JP | 2001-031826 | 2/2001 |

* cited by examiner

*Primary Examiner*—Roberto Rábago
(74) *Attorney, Agent, or Firm*—Cantor Colburn LLP

(57) ABSTRACT

Provided are an acrylic copolymer composition, a method for preparing an acrylic copolymer, and a vinyl chloride resin composition including the acrylic copolymer. The acrylic copolymer composition includes 5-15 wt % of a crosslinking agent and an alkyl acrylate monomer constituting an alkyl acrylate crosslinked polymer and 85-95 wt % of methyl methacrylate and at least one monomer selected from the group consisting of alkyl acrylate and alkyl methacrylate. Addition of the acrylic copolymer to the vinyl chloride resin composition enhances the foaming property of the vinyl chloride resin. Combination of the acrylic copolymer with an impact modifier further enhances the impact strength of the vinyl chloride resin.

10 Claims, No Drawings

ACRYLIC COPOLYMER COMPOSITION, METHOD FOR PREPARING ACRYLIC COPOLYMER, AND VINYL CHLORIDE RESIN COMPOSITION CONTAINING THE ACRYLIC COPOLYMER

TECHNICAL FIELD

The present invention relates to an acrylic copolymer composition, a method for preparing an acrylic copolymer, and a vinyl chloride resin composition containing the acrylic copolymer. More particularly, the present invention relates to an acrylic copolymer which improves the foamability of a vinyl chloride resin such as polyvinyl chloride (PVC) when used as an additive for the vinyl chloride resin and further improves the impact strength of the vinyl chloride resin when used in combination with an impact modifier, and a vinyl chloride resin composition containing the same.

BACKGROUND ART

Vinyl chloride resins are polymers containing 50% or more of vinyl chloride. Since the vinyl chloride resins are inexpensive, are easy in hardness adjustment, and can be applied in most processing machines, they have various application fields. In addition, the vinyl chloride resins can be processed into formed products with good physical and chemical properties, and thus, are widely used in various fields.

However, the vinyl chloride resins have many disadvantages in impact strength, processability, thermal stability, and heat deflection temperature. In this respect, additives for solving these disadvantages have been developed and used. Examples of additives for the vinyl chloride resins include impact modifiers, processing aids, stabilizers, and fillers, and are selectively used according to their purposes.

Recently, there has been an increasing interest in a foam-forming process to decrease the mass of vinyl chloride resins and costs of formed products. However, foam-forming of only vinyl chloride resins cannot provide a sufficient elongation and melt strength, which causes poor appearance of formed products and low expansion ratio due to large and non-uniform foamed cells. To solve these problems, addition of a mixture of a processing aid containing methyl methacrylate as a main component and a blowing agent to a vinyl chloride resin is generally used.

U.S. Pat. No. 6,140,417 discloses a vinyl chloride resin composition including a vinyl chloride resin and a processing aid for imparting improved processability and foamability to the vinyl chloride resin. The processing aid is prepared by three-stage polymerization of a compound selected from methyl methacrylate, alkyl acrylate, and alkyl methacrylate, and a copolymerizable vinyl monomer. The three-stage polymerization includes a first stage polymerization for a low glass transition temperature (Tg), a second stage polymerization for a higher Tg than the first stage polymerization, and a third stage polymerization for a lower Tg than the second stage polymerization. U.S. Pat. No. 6,221,966 discloses a vinyl chloride resin composition including a vinyl chloride resin and a processing aid prepared by two-stage polymerization to impart improved processability, transparency, and foamability to the vinyl chloride resin. The processing aid has a small particle size, its inner layer contains a small amount of methyl methacrylate for low Tg, and its outer layer contains a large amount of methyl methacrylate for high Tg. However, these vinyl chloride resin compositions are insufficient in terms of enhancement of processability and uniformity of foamed cells.

U.S. Pat. No. 6,391,976 discloses a vinyl chloride resin composition including a small quantity of a processing aid composed of methyl methacrylate and alkyl methacrylate of 3-5 carbon atoms. However, processability and foamability are insufficient.

In addition, there have been studies about combination of functions of several additives used to overcome many disadvantages of vinyl chloride resins, i.e., multi-purpose additives. Recently, in particular, studies about additives having combined characteristics of an impact modifier and a processing aid have been done. By way of example, European Patent No. EP 1,111,001 discloses a method for improving the impact strength of a vinyl chloride resin by adding powder particles composed of impact modifier particles and processing aid particles to the vinyl chloride resin, in which the powder particles are prepared by mixing an impact modifier and a processing aid in a latex phase, followed by coagulation and drying. However, this method is restrictive since latex mixing is required. Furthermore, this method is silent about information about formation of foamed products, and thus, a sufficient impact strength is not ensured.

DISCLOSURE OF INVENTION

In view of these problems, the present invention provides an acrylic copolymer composition which improves the foamability of a vinyl chloride resin when used as an additive for the vinyl chloride resin and further improves the impact strength of the vinyl chloride resin when used in combination with an impact modifier.

The present invention also provides a vinyl chloride resin composition containing an acrylic copolymer prepared from the acrylic copolymer composition, which is excellent in foamability.

The present invention also provides a vinyl chloride resin composition containing an acrylic copolymer prepared from the acrylic copolymer composition and an impact modifier, which is excellent in impact strength.

According to an aspect of the present invention, there is provided an acrylic copolymer composition including: (A) 5-15 wt % of a crosslinking agent and an alkyl acrylate monomer constituting an alkyl acrylate crosslinked polymer; (B) 55-90 wt % of methyl methacrylate; and (C) 5-40 wt % of at least one monomer selected from the group consisting of an alkyl acrylate compound and an alkyl methacrylate compound.

The degree of swelling of the alkyl acrylate crosslinked polymer may be in a range of 3 to 10.

The alkyl acrylate monomer constituting the alkyl acrylate crosslinked polymer may be an alkyl acrylate compound and the alkyl acrylate crosslinked polymer may be prepared from the crosslinking agent and the alkyl acrylate compound.

The crosslinking agent may be selected from the group consisting of allyl methacrylate, trimethylolpropane, triacrylate, and divinylbenzene.

The alkyl acrylate compound constituting the alkyl acrylate crosslinked polymer may have a straight, branched, or cyclic alkyl group of 1-18 carbon atoms.

The alkyl acrylate compound constituting the alkyl acrylate crosslinked polymer may be one or more selected from the group consisting of methyl acrylate, ethyl acrylate, n-butyl acrylate, lauryl acrylate, stearyl acrylate, 2-ethylhexyl acrylate, and cyclohexyl acrylate.

The alkyl acrylate compound of the monomer (C) may have a straight, branched, or cyclic alkyl group of 1-18 carbon atoms and the alkyl methacrylate compound of the monomer (C) may have a straight or cyclic alkyl group of 2-18 carbon atoms.

The alkyl acrylate compound of the monomer (C) may be one or more selected from the group consisting of methyl acrylate, ethyl acrylate, n-butyl acrylate, lauryl acrylate, stearyl acrylate, 2-ethylhexyl acrylate, and cyclohexyl acrylate. The alkyl methacrylate compound of the monomer (C) may be one or more selected from the group consisting of n-butyl methacrylate, lauryl methacrylate, stearyl methacrylate, tridecyl methacrylate, i-butyl methacrylate, t-butyl methacrylate, 2-ethylhexyl methacrylate, and cyclohexyl methacrylate.

The acrylic copolymer may have a weight average molecular weight of 1,000,000 to 12,000,000.

According to another aspect of the present invention, there is provided a method for preparing an acrylic copolymer, which includes emulsion polymerization, suspension polymerization, or solution polymerization of 5-15 wt % of a crosslinking agent and an alkyl acrylate monomer constituting an alkyl acrylate crosslinked polymer having the degree of swelling of 3 to 10; 55-90 wt % of methyl methacrylate; and 5-40 wt % of at least one monomer selected from the group consisting of an alkyl acrylate compound and an alkyl methacrylate compound.

The emulsion polymerization preparing an acrylic copolymer may include (a) (i) mixing 5-15 wt % of the crosslinking agent and the alkyl acrylate monomer to prepare an emulsion containing the alkyl acrylate crosslinked polymer having the degree of swelling of 3 to 10 and adding 27.5-45 wt % of the methyl methacrylate, 2.5-20 wt % of the at least one monomer selected from the group consisting of the alkyl acrylate compound with an alkyl group of 1-18 carbon atoms and the alkyl methacrylate compound with an alkyl group of 2-18 carbon atoms, an emulsifier, a polymerization initiator, and a redox catalyst, to the emulsion containing the alkyl acrylate crosslinked polymer or (ii) mixing 27.5-45 wt % of the methyl methacrylate, 2.5-20 wt % of the at least one monomer selected from the group consisting of the alkyl acrylate compound and the alkyl methacrylate compound, the emulsifier, the polymerization initiator, and the redox catalyst, and adding 5-15 wt % of the crosslinking agent and the alkyl acrylate monomer to the mixture; and (b) further adding 27.5-45 wt % of the methyl methacrylate, 2.5-20 wt % of the at least one monomer selected from the group consisting of the alkyl acrylate compound and the alkyl methacrylate compound, the emulsifier, the polymerization initiator, and the redox catalyst, to the resultant mixture of step (a).

According to another aspect of the present invention, there is provided a vinyl chloride resin composition including a vinyl chloride resin and 0.1-20 parts by weight of an acrylic copolymer prepared according to the method, based on 100 parts by weight of the vinyl chloride resin.

According to yet another aspect of the present invention, there is provided a vinyl chloride resin composition including a vinyl chloride resin and 1-30 parts by weight of a mixture comprising 5-30 wt % of an acrylic copolymer prepared according to the method and 70-95 wt % of an impact modifier, based on the 100 parts by weight of the vinyl chloride resin.

The impact modifier may be selected from the group consisting of acrylonitrile-butadiene-styrene (ABS), methyl methacrylate-butadiene-styrene (MBS), and acrylic compounds.

Hereinafter, the present invention will be described in more detail.

An acrylic copolymer prepared from an acrylic copolymer composition including a specific crosslinked polymer and a non-crosslinked polymer in a predetermined ratio according to the present invention improves the foamability of a vinyl chloride resin when added to the vinyl chloride resin. Further, when a mixture of the acrylic copolymer and an impact modifier is used as an additive for the vinyl chloride resin, the vinyl chloride resin can have a higher impact strength, as compared to when the impact modifier is used alone.

That is, the acrylic copolymer composition of the present invention includes 5-15 wt % of a crosslinking agent and an alkyl acrylate monomer constituting an alkyl acrylate crosslinked polymer; and 55-90 wt % of methyl methacrylate and 5-40 wt % of at least one selected from the group consisting of an alkyl acrylate compound and an alkyl methacrylate compound constituting a non-crosslinked copolymer.

Preferably, the alkyl acrylate crosslinked polymer has the degree of swelling from 3 to 10 to lower its glass transition temperature. The alkyl acrylate crosslinked polymer serves to increase the degree of swelling of the acrylic copolymer of the present invention, thereby enhancing die swell characteristics, and is prepared from a crosslinking agent and an alkyl acrylate compound. If the degree of swelling is less than 3, good die swell characteristics may not be obtained. On the other hand, if it exceeds 10, processability suitable for a vinyl chloride resin may not be ensured, which makes it difficult to produce a good foamed product.

Preferably, the crosslinking agent and the alkyl acrylate monomer constituting the alkyl acrylate crosslinked polymer are used in an amount of 5 to 15 wt %. If the content of the crosslinking agent and the alkyl acrylate monomer is less than 5 wt %, a formed product may have an insufficient expansion ratio. On the other hand, if it exceeds 15 wt %, fine and uniform foamed cells may not be obtained.

Preferably, the crosslinking agent is allyl methacrylate, trimethylolpropane, triacrylate, divinylbenzene, or the like.

Preferably, the alkyl acrylate compound constituting the alkyl acrylate crosslinked polymer has a straight, branched, or cyclic alkyl group of 1-18 carbon atoms. More preferably, the alkyl acrylate compound is methyl acrylate, ethyl acrylate, n-butyl acrylate, lauryl acrylate, stearyl acrylate, 2-ethylhexyl acrylate, or cyclohexyl acrylate.

Preferably, the methyl methacrylate constituting the non-crosslinked polymer is used in an amount of 55-90 wt %, based on the total weight of the acrylic copolymer composition. If the content of the methyl methacrylate is less than 55 wt %, compatibility with a vinyl chloride resin may be lowered, thereby deteriorating processability. On the other hand, if it exceeds 90 wt %, dispersibility in a vinyl chloride resin composition may be lowered, thereby producing fish-eyes. More preferably, the methyl methacrylate is used in an amount of 70 to 80 wt %.

Preferably, the alkyl acrylate compound constituting the non-crosslinked copolymer has a straight, branched, or cyclic alkyl group of 1-18 carbon atoms and the alkyl methacrylate compound constituting the non-crosslinked copolymer has a straight or cyclic alkyl group of 2-18 carbon atoms. More preferably, the alkyl acrylate compound is methyl acrylate, ethyl acrylate, n-butyl acrylate, lauryl acrylate, stearyl acrylate, 2-ethylhexyl acrylate, or cyclohexyl acrylate, and the alkyl methacrylate compound is n-butyl methacrylate, lauryl methacrylate, stearyl methacrylate, tridecyl methacrylate, i-butyl methacrylate, t-butyl methacrylate, 2-ethylhexyl methacrylate, or cyclohexyl methacrylate.

Preferably, the weight average molecular weight of an acrylic copolymer, except a crosslinked polymer component, prepared from the above-described composition is in a range of 1,000,000 to 12,000,000.

A method for preparing an acrylic copolymer is not limited by polymerization methods. Preferably, emulsion polymerization, suspension polymerization or solution polymerization are used and the emulsion polymerization is more preferable.

That is, a method for preparing an acrylic copolymer by an emulsion polymerization according to the present invention may include (a) (i) mixing 5-15 wt % of a crosslinking agent and an alkyl acrylate monomer to prepare an emulsion containing an alkyl acrylate crosslinked polymer having the degree of swelling of 3 to 10 and adding 27.5-45 wt % of methyl methacrylate, 2.5-20 wt % of at least one monomer selected from the group consisting of an alkyl acrylate compound with an alkyl group of 1-18 carbon atoms and an alkyl methacrylate compound with an alkyl group of 2-18 carbon atoms, an emulsifier, a polymerization initiator, and a redox catalyst, to the emulsion containing the alkyl acrylate crosslinked polymer or (ii) mixing 27.5-45 wt % of the methyl methacrylate, 2.5-20 wt % of the at least one monomer selected from the group consisting of the alkyl acrylate compound with an alkyl group of 1-18 carbon atoms and the alkyl methacrylate compound with an alkyl group of 2-18 carbon atoms, the emulsifier, the polymerization initiator, and the redox catalyst, and adding 5-15 wt % of the crosslinking agent and the alkyl acrylate monomer to the mixture; and (b) further adding 27.5-45 wt % of the methyl methacrylate, 2.5-20 wt % of the at least one monomer selected from the group consisting of the alkyl acrylate compound with an alkyl group of 1-18 carbon atoms and the alkyl methacrylate compound with an alkyl group of 2-18 carbon atoms, the emulsifier, the polymerization initiator, and the redox catalyst, to the resultant mixture of step (a).

Preferably, the emulsifier is used in an amount of 0.5 to 5 wt %, based on the total weight of all components used in the preparation of the acrylic copolymer. There are no particular limitations on the type of the emulsifier that can be used herein. However, it is preferable to use, as the emulsifier, an anionic emulsifier such as aliphatic ester, alkyl benzene sulfonate, alkyl phosphate, and dialkyl sulfosuccinate, and a non-ionic emulsifier such as polyoxyethylene alkyl ether and alkylamine ester, alone or in combination.

Preferably, the crosslinking agent is used in an amount of 0.01 to 0.3 wt %, based on the total weight of all components used in the preparation of the acrylic copolymer. The crosslinking agent may be allyl methacrylate, trimethylolpropane, triacrylate, or divinylbenzene. An acrylate compound is more preferable.

Preferably, the polymerization initiator is used in an amount of 0.0005 to 0.005 wt %, based on the total weight of all components used in the preparation of the acrylic copolymer. The polymerization initiator may be a water-soluble initiator such as potassium persulfate, ammonium persulfate, and sodium persulfate, an oil-soluble initiator such as t-butyl hydroperoxide, cumene hydroperoxide, benzoyl peroxide, and lauryl peroxide, or a redox initiator.

Preferably, the redox catalyst is used in an amount of 0.01 to 0.1 wt %, based on the total weight of all components used in the preparation of the acrylic copolymer. The redox catalyst may be sodium formaldehydesulfoxylate, disodium ethylenediaminetetraacetate, sodium formaldehyde sulfoxylate, ferrous sulfate, sodium ethylenediaminetetraacetate, or cupric sulfate.

A latex acrylic copolymer prepared by the emulsion polymerization is converted to a powdery acrylic copolymer by coagulation, dehydration, and drying.

The acrylic copolymer prepared as described above can be contained in a vinyl chloride resin composition to impart good foamability to a vinyl chloride resin. Therefore, the present invention also provides a vinyl chloride resin composition including a vinyl chloride resin and 0.1 to 20 parts by weight of the acrylic copolymer, based on 100 parts by weight of the vinyl chloride resin. A use of the acrylic copolymer within the above content range can enhance a melt strength and a die swell property which are important factors for extrusion-foaming of the vinyl chloride resin, resulting in a foamed product which is excellent in foam density, expansion ratio, uniformity of foamed cells, and the like.

The present invention also provides a vinyl chloride resin composition including a vinyl chloride resin and 1-30 parts by weight of a mixture comprising 5-30 wt % of the acrylic copolymer and 70-95 wt % of an impact modifier, based on 100 parts by weight of the vinyl chloride resin. The combination of the acrylic copolymer of the present invention and the impact modifier can provide a higher impact strength, as compared to when the impact modifier is used alone, which makes it possible to produce a formed product with a sufficient impact strength.

Preferably, the impact modifier is acrylonitrile-butadiene-styrene (ABS), methyl methacrylate-butadiene-styrene (MBS), or an acrylic modifier. The acrylic modifier is more preferable in terms of weatherability of a formed product.

Hereinafter, the present invention will be described more specifically by Examples but the present invention is not limited to or by them.

MODES FOR CARRYING OUT THE INVENTION

Examples 1-10 and Comparative Examples 1-7

Preparation of Acrylic Copolymers

Example 1

(1) Preparation of Acrylic Copolymer 420 g of ion exchange water, 10 g of a 8% potassium salt solution of fatty acid, 59.5 g of butyl acrylate, and 0.5 g of allyl methacrylate were placed in a 3 l four-necked flask reactor equipped with a stirrer, a thermocouple, a nitrogen inlet, and a reflux condenser, to prepare an emulsion. Then, the reactor was maintained at an internal temperature of 62° C. under a nitrogen atmosphere and 0.45 g of t-butyl hydroperoxide (10% diluted solution) and 12 g of an activation solution were added to the reactor to perform a primary batch reaction. As the activation solution, there was used a mixture of 0.017 g of disodium ethylenediaminetetraacetate (EDTA), 0.04 g of sodium formaldehyde sulfoxylate (SFS), 0.001 g of ferrous sulfate, and 1.406 g of ion exchange water.

After the primary batch reaction was terminated, the reactor was stirred at the same temperature for one hour and then maintained at an internal temperature of 40° C. Then, 162 g of ion exchange water, 25 g of a 8% potassium salt solution of fatty acid, and a monomer mixture prepared by mixing 229.5 g of methyl methacrylate and 40.5 g of butyl acrylate in a ratio of 85:15 were added to the reactor to prepare an emulsion. Then, the reactor was maintained at an internal temperature of 40° C. under a nitrogen atmosphere and 0.3 g of t-butyl hydroperoxide (10% diluted solution) and 6.7 g of the same activation solution as used for the primary batch reaction were added to the reactor to perform a secondary batch reaction.

After the secondary batch reaction was terminated, the reactor was further stirred for 1.5 hours and then maintained at an internal temperature of 40° C. Then, 162 g of ion exchange water, 25 g of a 8% potassium salt solution of fatty acid, and a monomer mixture prepared by mixing 229.5 g of methyl methacrylate and 40.5 g of butyl acrylate in a ratio of 85:15 were added to the reactor to prepare an emulsion. Then, the reactor was maintained at an internal temperature of 40° C. under a nitrogen atmosphere and 0.3 g of t-butyl hydroperoxide (10% diluted solution) and 6.7 g of the same activation solution as used for the primary batch reaction were added to the reactor to perform a tertiary batch reaction.

After the tertiary batch reaction was terminated, the reactor was further stirred for one hour to give a latex acrylic copolymer. The latex acrylic copolymer was subjected to coagulation with calcium chloride, dehydration, and drying, to give a powdery acrylic copolymer.

Main components used in each reaction process for the preparation of the acrylic copolymer of Example 1 and acrylic copolymers of Examples 2-10 and Comparative Examples 1-7 as will be described later are summarized in Table 1 below.

(2) Measurement of Degree of Swelling and Weight Average Molecular Weight of Acrylic Copolymer 0.3 g of the powdery acrylic copolymer as prepared in Section (1) was dissolved in 100 ml of tetrahydrofuran (THF) for 50 hours and centrifuged at 16,000 rpm for 2 hours. After the centrifugation, a swelled gel and a sol were separated to measure the weight of the swelled gel. The swelled gel was then dried to measure the weight of the dried gel. The degree of swelling of the powdery acrylic copolymer was calculated according to the following Equation 1 and the result is presented in Table 2 below:

Degree of swelling=weight of swelled gel/weight of dried gel  [Equation 1]

Furthermore, the weight average molecular weight of the sol of the acrylic copolymer was measured using gel permeation chromatography (GPC) and the result is presented in Table 2 below. The weight average molecular weight of the acrylic copolymer except the crosslinked polymer component was 4,300,000.

Example 2

An acrylic copolymer was prepared in the same manner as in Example 1 except that ethyl acrylate was used in the primary batch reaction, instead of the butyl acrylate. The degree of swelling and weight average molecular weight of the acrylic copolymer were measured and the results are presented in Table 2 below.

Example 3

An acrylic copolymer was prepared in the same manner as in Example 1 except that 59.5 g of a monomer mixture prepared by mixing ethyl acrylate and butyl acrylate in a ratio of 1:1 was used in the primary batch reaction, instead of 59.5 g of the butyl acrylate. The degree of swelling and weight average molecular weight of the acrylic copolymer were measured and the results are presented in Table 2 below.

Example 4

An acrylic copolymer was prepared in the same manner as in Example 1 except that a monomer mixture prepared by mixing 216 g of methyl methacrylate and 54 g of butyl acrylate in a ratio of 80:20 was used in the secondary and tertiary batch reactions. The degree of swelling and weight average molecular weight of the acrylic copolymer were measured and the results are presented in Table 2 below.

Example 5

532 g of ion exchange water, 25 g of a 8% potassium salt solution of fatty acid, and a monomer mixture prepared by mixing 216 g of methyl methacrylate and 54 g of butyl acrylate in a ratio of 80:20 were placed in a 3 l four-necked flask reactor equipped with a stirrer, a thermocouple, a nitrogen inlet, and a reflux condenser, to prepare an emulsion. Then, the reactor was maintained at an internal temperature of 40° C. under a nitrogen atmosphere and 0.3 g of t-butyl hydroperoxide (10% diluted solution) and 6.7 g of the same activation solution as in Example 1 were added to the reactor to perform a primary batch reaction.

After the primary batch reaction was terminated, the reactor was stirred at the same temperature for one hour. Then, 50 g of ion exchange water, 10 g of a 8% potassium salt solution of fatty acid, 59.5 g of butyl acrylate, and 0.5 g of allyl methacrylate were added to the reactor to prepare an emulsion. Then, the reactor was maintained at an internal temperature of 62° C. under a nitrogen atmosphere and 0.45 g of t-butyl hydroperoxide (10% diluted solution) and 12 g of the same activation solution as in Example 1 were added to the reactor to perform a secondary batch reaction.

After the secondary batch reaction was terminated, the reactor was further stirred for 1.5 hours and then maintained at an internal temperature of 40° C. Then, 162 g of ion exchange water, 25 g of a 8% potassium salt solution of fatty acid, and a monomer mixture prepared by mixing 216 g of methyl methacrylate and 54 g of butyl acrylate in a ratio of 80:20 were added to the reactor to prepare an emulsion. Then, the reactor was maintained at an internal temperature of 40° C. under a nitrogen atmosphere and 0.3 g of t-butyl hydroperoxide (10% diluted solution) and 6.7 g of the same activation solution as in Example 1 were added to the reactor to perform a tertiary batch reaction.

After the tertiary batch reaction was terminated, the reactor was further stirred for one hour to give a latex acrylic copolymer. The latex acrylic copolymer was subjected to coagulation with calcium chloride, dehydration, and drying, to give a powdery acrylic copolymer. The degree of swelling and weight average molecular weight of the acrylic copolymer were measured and the results are presented in Table 2 below.

Example 6

532 g of ion exchange water, 25 g of a 8% potassium salt solution of fatty acid, and a monomer mixture prepared by mixing 216 g of methyl methacrylate and 54 g of butyl acrylate in a ratio of 80:20 were added to a 3 l four-necked flask reactor equipped with a stirrer, a thermocouple, a nitrogen inlet, and a reflux condenser, to prepare an emulsion. Then, the reactor was maintained at an internal temperature of 40° C. under a nitrogen atmosphere and 0.3 g of t-butyl hydroperoxide (10% diluted solution) and 6.7 g of the same activation solution as in Example 1 were added to the reactor to perform a primary batch reaction.

After the primary batch reaction was terminated, the reactor was further stirred for 1.5 hours and maintained at an internal temperature of 40° C. Then, 162 g of ion exchange water, 25 g of a 8% potassium salt solution of fatty acid, and a monomer mixture prepared by mixing 216 g of methyl methacrylate and 54 g of butyl acrylate in a ratio of 80:20 were added to the reactor to prepare an emulsion. Then, the reactor was maintained at an internal temperature of 40° C. under a nitrogen atmosphere, and 0.3 g of t-butyl hydroperoxide (10% diluted solution) and 6.7 g of the same activation solution as in Example 1 were added to the reactor to perform a secondary batch reaction.

After the secondary batch reaction was terminated, the reactor was further stirred for 1.5 hours. Then, 50 g of ion exchange water, 10 g of a 8% potassium salt solution of fatty acid, 59.5 g of butyl acrylate, and 0.5 g of allyl methacrylate were added to the reactor to prepare an emulsion. Then, the reactor was maintained at an internal temperature of 62° C. under a nitrogen atmosphere and 0.45 g of t-butyl hydroperoxide (10% diluted solution) and 12 g of the same activation solution as in Example 1 were added to the reactor to perform a tertiary batch reaction.

After the tertiary batch reaction was terminated, the reactor was further stirred for one hour to give a latex acrylic copolymer. The latex acrylic copolymer was subjected to coagulation with calcium chloride, dehydration, and drying, to give a powdery acrylic copolymer. The degree of swelling and weight average molecular weight of the acrylic copolymer were measured and the results are presented in Table 2 below.

Example 7

An acrylic copolymer was prepared in the same manner as in Example 4 except that ethyl acrylate was used in the primary batch reaction, instead of the butyl acrylate. The degree of swelling and weight average molecular weight of the acrylic copolymer were measured and the results are presented in Table 2 below.

Example 8

An acrylic copolymer was prepared in the same manner as in Example 4 except that 59.5 g of a monomer mixture prepared by mixing ethyl acrylate and butyl acrylate in a ratio of 1:1 was used in the primary batch reaction, instead of 59.5 g of the butyl acrylate. The degree of swelling and weight average molecular weight of the acrylic copolymer were measured and the results are presented in Table 2 below.

Example 9

An acrylic copolymer was prepared in the same manner as in Example 4 except that 0.1 g of the t-butyl hydroperoxide (10% diluted solution) and 3.4 g of the activation solution were used in the secondary and tertiary batch reactions. The degree of swelling and weight average molecular weight of the acrylic copolymer were measured and the results are presented in Table 2 below.

Example 10

An acrylic copolymer was prepared in the same manner as in Example 4 except that in the secondary and tertiary batch reactions, the internal temperature of the reactor was maintained at 35° C. and 0.06 g of the t-butyl hydroperoxide (10% diluted solution) and 2.3 g of the activation solution were used. The degree of swelling and weight average molecular weight of the acrylic copolymer were measured and the results are presented in Table 2 below.

Comparative Example 1

An acrylic copolymer was prepared in the same manner as in Example 1 except that allyl methacrylate as a crosslinking agent was not used in the primary batch reaction. The weight average molecular weight of the acrylic copolymer was measured by GPC using THF as a mobile phase and the result is presented in Table 2 below.

The weight average molecular weights of the acrylic copolymer of Comparative Example 1 and acrylic copolymers of Comparative Examples 2 and 7 as will be described later were measured by GPC using THF as a mobile phase.

Comparative Example 2

An acrylic copolymer was prepared in the same manner as in Example 5 except that allyl methacrylate as a crosslinking agent was not used in the secondary batch reaction. The weight average molecular weight of the acrylic copolymer was measured by GPC using THF as a mobile phase and the result is presented in Table 2 below.

Comparative Example 3

An acrylic copolymer was prepared in the same manner as in Example 1 except that 58.5 g of butyl acrylate and 1.5 g of allyl methacrylate were used in the primary batch reaction. The degree of swelling and weight average molecular weight of the acrylic copolymer were measured and the results are presented in Table 2 below.

Comparative Example 4

An acrylic copolymer was prepared in the same manner as in Example 1 except that 59.9 g of butyl acrylate and 0.1 g of allyl methacrylate were used in the primary batch reaction. The degree of swelling and weight average molecular weight of the acrylic copolymer were measured and the results are presented in Table 2 below.

Comparative Example 5

An acrylic copolymer was prepared in the same manner as in Example 4 except that 26.78 g of butyl acrylate and 0.22 g of allyl methacrylate were used in the primary batch reaction and a monomer mixture prepared by mixing 229.2 g of methyl methacrylate and 57.3 g of butyl acrylate in a ratio of 80:20 was used in the secondary and tertiary batch reactions. The degree of swelling and weight average molecular weight of the acrylic copolymer were measured and the results are presented in Table 2 below.

Comparative Example 6

An acrylic copolymer was prepared in the same manner as in Example 4 except that 92.23 g of butyl acrylate and 0.77 g of allyl methacrylate were used in the primary batch reaction and a monomer mixture prepared by mixing 202.8 g of methyl methacrylate and 50.7 g of butyl acrylate in a ratio of 80:20 was used in the secondary and tertiary batch reactions. The degree of swelling and weight average molecular weight of the acrylic copolymer were measured and the results are presented in Table 2 below.

Comparative Example 7

420 g of ion exchange water, 10 g of a 8% potassium salt solution of fatty acid, 51 g of methyl methacrylate, and 9 g of butyl acrylate were placed in a 3 l four-necked flask reactor equipped with a stirrer, a thermocouple, a nitrogen inlet, and a reflux condenser, to prepare an emulsion. Then, the reactor was maintained at an internal temperature of 62° C. under a nitrogen atmosphere and 0.45 g of t-butyl hydroperoxide (10% diluted solution) and 12 g of the same activation solution as in Example 1 were added to the reactor to perform a primary batch reaction.

After the primary batch reaction was terminated, the reactor was stirred at the same temperature for one hour and then adjusted to an internal temperature of 40° C. Then, 162 g of ion exchange water, 25 g of a 8% potassium salt solution of fatty acid, and a monomer mixture prepared by mixing 229.5 g of methyl methacrylate and 40.5 g of butyl acrylate in a ratio of 85:15 were added to the reactor to prepare an emulsion. Then, the reactor was maintained at an internal temperature of 40° C. under a nitrogen atmosphere, and 0.3 g of t-butyl hydroperoxide (10% diluted solution) and 6.7 g of the same activation solution as in Example 1 were added to the reactor to perform a secondary batch reaction.

After the secondary batch reaction was terminated, the reactor was further stirred for 1.5 hours and then adjusted to an internal temperature of 40° C. Then, 162 g of ion exchange water, 25 g of a 8% potassium salt solution of fatty acid, and a monomer mixture prepared by mixing 229.5 g of methyl methacrylate and 40.5 g of butyl acrylate in a ratio of 85:15 were added to the reactor to prepare an emulsion. Then, the reactor was maintained at an internal temperature of 40° C. under a nitrogen atmosphere, and 0.3 g of t-butyl hydroperoxide (10% diluted solution) and 6.7 g of the same activation solution as in Example 1 were added to the reactor to perform a tertiary batch reaction.

After the tertiary batch reaction was terminated, the reactor was further stirred for one hour to give a latex acrylic copolymer. The latex acrylic copolymer was subjected to coagulation with calcium chloride, dehydration, and drying, to give a powdery acrylic copolymer. The weight average molecular weight of the powdery acrylic copolymer was measured by GPC using THF as a mobile phase and the result is presented in Table 2 below.

Examples 11-20 and Comparative Examples 8-14

Preparation of Vinyl Chloride Resins with Good Foaming Property Using Acrylic Copolymers

Example 11

(1) Preparation of Vinyl Chloride Resin Modified by Acrylic Copolymer (with Filler)

6.4 g of a composite stabilizer KD-105 (Dansuk Industrial Co., Ltd.) prepared by uniformly mixing a thermal stabilizer and a lubricant, which is used as both a thermal stabilizer and a foam stabilizer, and 14 g of a filler ($CaCO_3$) were added to 100 g of a vinyl chloride resin (LS080, LG Chemical, Co., Ltd.). Then, 5 g of the acrylic copolymer prepared in Example 1 and 0.8 g of azodicarbonamide were added and mixed by a Henschel mixer with heating to 115° C. to prepare a vinyl chloride resin modified with the acrylic copolymer.

(2) Measurement of Melt Time of Vinyl Chloride Resin 64 g of the vinyl chloride resin prepared in Section (1) was mixed at 18° C. and 40 rpm in a Brabender. Then, a melt time defined as a time required from minimum load to maximum load was measured and is presented in Table 2 below.

(3) Evaluation of Foaming Property of Vinyl Chloride Resin

The vinyl chloride resin prepared in Section (1) was extruded in the form of a rectangular rod of 5 mm (thickness)×30 mm (width) using a 30 mm single spindle extruder equipped with a rectangular slit die at a cylinder temperature of 180° C. and a screw speed of 30 rpm and then cut into length of 5 mm. The foam density of the foamed products thus obtained was measured using a gravimeter and the result is presented in Table 2 below. As the foam density decreases, foaming property is good.

Meanwhile, based on an expansion ratio defined as the ratio (a/b) of the foam density (a) of a foamed product with no acrylic copolymer to the foam density (b) of a foamed product with acrylic copolymer, the expansion ratio of the foamed products of this Example was calculated and the result is presented in Table 2 below.

In addition, the sections of the foamed products were observed with an optical microscope. Scoring criteria were as follows: 5=uniform foamed cells, 3=slightly non-uniform foamed cells, and 1=non-uniform foamed cells. The results are presented in Table 2 below.

(4) Preparation of Vinyl Chloride Resin Modified by Acrylic Copolymer (with No Filler)

A vinyl chloride resin was prepared in the same manner as in Section (1) except that no fillers were used.

(5) Measurement of Fish-Eyes in Vinyl Chloride Resin

The vinyl chloride resin prepared in Section (4) was extruded in the form of 0.2 mm thickness film using a 20 mm single spindle extruder equipped with a T-die at a cylinder temperature of 180° C. and screw speed of 30 rpm and then the number of fish-eyes present in a predetermined surface region of the film was counted with a naked eye. Scoring criteria were as follows: 5=few fish-eyes, 3=a few fish-eyes, and 1=many fish-eyes. The evaluation result is presented in Table 2 below.

Example 12

A vinyl chloride resin was prepared in the same manner as in Example 11 using the acrylic copolymer of Example 2. The melt time, foaming property, and the number of fish-eyes of the vinyl chloride resin were evaluated and the evaluation results are presented in Table 2 below.

Example 13

A vinyl chloride resin was prepared in the same manner as in Example 11 using the acrylic copolymer of Example 3. The melt time, foaming property, and the number of fish-eyes of the vinyl chloride resin were evaluated and the evaluation results are presented in Table 2 below.

Example 14

A vinyl chloride resin was prepared in the same manner as in Example 11 using the acrylic copolymer of Example 4. The melt time, foaming property, and the number of fish-eyes of the vinyl chloride resin were evaluated and the evaluation results are presented in Table 2 below.

Example 15

A vinyl chloride resin was prepared in the same manner as in Example 11 using the acrylic copolymer of Example 5. The melt time, foaming property, and the number of fish-eyes of the vinyl chloride resin were evaluated and the evaluation results are presented in Table 2 below.

Example 16

A vinyl chloride resin was prepared in the same manner as in Example 11 using the acrylic copolymer of Example 6. The melt time, foaming property, and the number of fish-eyes of the vinyl chloride resin were evaluated and the evaluation results are presented in Table 2 below.

Example 17

A vinyl chloride resin was prepared in the same manner as in Example 11 using the acrylic copolymer of Example 7. The melt time, foaming property, and the number of fish-eyes of the vinyl chloride resin were evaluated and the evaluation results are presented in Table 2 below.

Example 18

A vinyl chloride resin was prepared in the same manner as in Example 11 using the acrylic copolymer of Example 8. The melt time, foaming property, and the number of fish-eyes of the vinyl chloride resin were evaluated and the evaluation results are presented in Table 2 below.

Example 19

A vinyl chloride resin was prepared in the same manner as in Example 11 using the acrylic copolymer of Example 9. The melt time, foaming property, and the number of fish-eyes of the vinyl chloride resin were evaluated and the evaluation results are presented in Table 2 below.

Example 20

A vinyl chloride resin was prepared in the same manner as in Example 11 using the acrylic copolymer of Example 10. The melt time, foaming property, and the number of fish-eyes of the vinyl chloride resin were evaluated and the evaluation results are presented in Table 2 below.

Comparative Example 8

A vinyl chloride resin was prepared in the same manner as in Example 11 using the acrylic copolymer of Comparative Example 1. The melt time, foaming property, and the number of fish-eyes of the vinyl chloride resin were evaluated and the evaluation results are presented in Table 2 below.

Comparative Example 9

A vinyl chloride resin was prepared in the same manner as in Example 11 using the acrylic copolymer of Comparative Example 2. The melt time, foaming property, and the number of fish-eyes of the vinyl chloride resin were evaluated and the evaluation results are presented in Table 2 below.

Comparative Example 10

A vinyl chloride resin was prepared in the same manner as in Example 11 using the acrylic copolymer of Comparative Example 3. The melt time, foaming property, and the number of fish-eyes of the vinyl chloride resin were evaluated and the evaluation results are presented in Table 2 below.

Comparative Example 11

A vinyl chloride resin was prepared in the same manner as in Example 11 using the acrylic copolymer of Comparative Example 4. The melt time, foaming property, and the number of fish-eyes of the vinyl chloride resin were evaluated and the evaluation results are presented in Table 2 below.

Comparative Example 12

A vinyl chloride resin was prepared in the same manner as in Example 11 using the acrylic copolymer of Comparative Example 5. The melt time, foaming property, and the number of fish-eyes of the vinyl chloride resin were evaluated and the evaluation results are presented in Table 2 below.

Comparative Example 13

A vinyl chloride resin was prepared in the same manner as in Example 11 using the acrylic copolymer of Comparative Example 6. The melt time, foaming property, and the number of fish-eyes of the vinyl chloride resin were evaluated and the evaluation results are presented in Table 2 below.

Comparative Example 14

A vinyl chloride resin was prepared in the same manner as in Example 11 using the acrylic copolymer of Comparative Example 7. The melt time, foaming property, and the number of fish-eyes of the vinyl chloride resin were evaluated and the evaluation results are presented in Table 2 below.

TABLE 1

| | Main components (g) of each reaction | | |
|---|---|---|---|
| Section | Primary reaction | Secondary reaction | Tertiary reaction |
| Exam. 1 | Butyl acrylate (59.5) allyl methacrylate (0.5) | Methyl methacrylate (229.5) Butyl acrylate (40.5) | Methyl methacrylate (229.5) Butyl acrylate (40.5) |
| Exam. 2 | Ethyl acrylate (59.5) allyl methacrylate (0.5) | Methyl methacrylate (229.5) Butyl acrylate (40.5) | Methyl methacrylate (229.5) Butyl acrylate (40.5) |
| Exam. 3 | 1:1 mixture of butyl acrylate and ethyl acrylate (59.5) allyl methacrylate (0.5) | Methyl methacrylate (229.5) Butyl acrylate (40.5) | Methyl methacrylate (229.5) Butyl acrylate (40.5) |
| Exam. 4 | Butyl acrylate (59.5) allyl methacrylate (0.5) | Methyl methacrylate (216.0) Butyl acrylate (54.0) | Methyl methacrylate (216.0) Butyl acrylate (54.0) |
| Exam. 5 | Methyl methacrylate (216.0) Butyl acrylate (54.0) | Butyl acrylate (59.5) allyl methacrylate (0.5) | Methyl methacrylate (216.0) Butyl acrylate (54.0) |
| Exam. 6 | Methyl methacrylate (216.0) Butyl acrylate (54.0) | Methyl methacrylate (216.0) Butyl acrylate (54.0) | Butyl acrylate (59.5) allyl methacrylate (0.5) |

TABLE 1-continued

Main components (g) of each reaction

| Section | Primary reaction | Secondary reaction | Tertiary reaction |
|---|---|---|---|
| Exam. 7 | Ethyl acrylate (59.5) allyl methacrylate (0.5) | Methyl methacrylate (216.0) Butyl acrylate (54.0) | Methyl methacrylate (216.0) Butyl acrylate (54.0) |
| Exam. 8 | 1:1 mixture of butyl acrylate and ethyl acrylate (59.5) allyl methacrylate (0.5) | Methyl methacrylate (216.0) Butyl acrylate (54.0) | Methyl methacrylate (216.0) Butyl acrylate (54.0) |
| Exam. 9 | Butyl acrylate (59.5) allyl methacrylate (0.5) | Methyl methacrylate (216.0) Butyl acrylate (54.0) | Methyl methacrylate (216.0) Butyl acrylate (54.0) |
| Exam. 10 | Butyl acrylate (59.5) allyl methacrylate (0.5) | Methyl methacrylate (216.0) Butyl acrylate (54.0) | Methyl methacrylate (216.0) Butyl acrylate (54.0) |
| Comp. 1 | Butyl acrylate (59.5) | Methyl methacrylate (229.5) Butyl acrylate (40.5) | Methyl methacrylate (229.5) Butyl acrylate (40.5) |
| Comp. 2 | Methyl methacrylate (216.0) Butyl acrylate (54.0) | Butyl acrylate (59.5) | Methyl methacrylate (216.0) Butyl acrylate (54.0) |
| Comp. 3 | Butyl acrylate (58.5) allyl methacrylate (1.5) | Methyl methacrylate (229.5) Butyl acrylate (40.5) | Methyl methacrylate (229.5) Butyl acrylate (40.5) |
| Comp. 4 | Butyl acrylate (59.9) allyl methacrylate (0.1) | Methyl methacrylate (229.5) Butyl acrylate (40.5) | Methyl methacrylate (229.5) Butyl acrylate (40.5) |
| Comp. 5 | Butyl acrylate (26.78) allyl methacrylate (0.22) | Methyl methacrylate (229.2) Butyl acrylate (57.3) | Methyl methacrylate (229.2) Butyl acrylate (57.3) |
| Comp. 6 | Butyl acrylate (92.23) allyl methacrylate (0.77) | Methyl methacrylate (202.8) Butyl acrylate (50.7) | Methyl methacrylate (202.8) Butyl acrylate (50.7) |
| Comp. 7 | Methyl methacrylate (51.0) Butyl acrylate (9.0) | Methyl methacrylate (229.5) Butyl acrylate (40.5) | Methyl methacrylate (229.5) Butyl acrylate (40.5) |

Exam.: Example,
Comp.: Comparative Example

As shown in Table 2, the vinyl chloride resins of Examples 11-20 prepared using the acrylic copolymers of Examples 1-10 in which a crosslinked polymer was prepared from allyl methacrylate as a crosslinking agent and alkyl acrylate, exhibited superior foam density, expansion ratio, and uniformity of foamed cells, as compared to the vinyl chloride resins of Comparative Examples 8 and 9 prepared using the acrylic copolymers of Comparative Examples 1 and 2 in which no crosslinked polymers were prepared due to the absence of a crosslinking agent such as allyl methacrylatearyl methacrylate.

Furthermore, the vinyl chloride resin of Comparative Example 10 prepared using the acrylic copolymer of Comparative Example 3 having the degree of swelling of 2.3 exhibited poor die swell property, thereby lowering an expansion ratio, as compared to the vinyl chloride resins of Examples 11-20 prepared using the acrylic copolymers of Examples 1-10 having the degree of swelling of 3 to 10. The vinyl chloride resin of Comparative Example 11 prepared using the acrylic copolymer of Comparative Example 4 having the degree of swelling of 11.2 exhibited a high expansion ratio but poor processability, thereby lowering foaming properties.

The vinyl chloride resin of Comparative Example 12 prepared using the acrylic copolymer of Comparative Example 5, in which the content of alkyl acrylate and a crosslinking agent was 4.5 wt % per the total weight of all the monomers used in the preparation of the acrylic copolymer, exhibited a low expansion ratio, resulting in a poor foamed product. On the other hand, the vinyl chloride resin of Comparative Example 13 prepared using the acrylic copolymer of Comparative Example 6, in which the content of alkyl acrylate and a crosslinking agent was 15.5 wt % per the total weight of all the monomers used in the preparation of the acrylic copolymer, produced non-uniform foamed cells.

The vinyl chloride resin of Comparative Example 14 prepared using the acrylic copolymer of Comparative Example 7, in which no crosslinked polymer was prepared due to the

TABLE 2

| Section | Degree of swelling | WAMW (×10,000) | Section | Melt time (s) | Fish eye | Foam density (g/cm$^3$) | Expansion ratio | Uniformity of foamed cells |
|---|---|---|---|---|---|---|---|---|
| Exam. 1 | 6.1 | 430 | Exam. 11 | 93 | 4.0 | 0.72 | 1.65 | 4.5 |
| Exam. 2 | 6.6 | 410 | Exam. 12 | 89 | 4.0 | 0.73 | 1.63 | 4.0 |
| Exam. 3 | 6.3 | 410 | Exam. 13 | 92 | 4.0 | 0.73 | 1.63 | 4.5 |
| Exam. 4 | 6.2 | 420 | Bxam. 14 | 90 | 5.0 | 0.71 | 1.68 | 4.5 |
| Exam. 5 | 5.9 | 410 | Exam. 15 | 88 | 5.0 | 0.72 | 1.65 | 4.0 |
| Exam. 6 | 5.6 | 410 | Exam. 16 | 88 | 4.0 | 0.73 | 1.63 | 4.0 |
| Exam. 7 | 6.1 | 410 | Exam. 17 | 88 | 5.0 | 0.73 | 1.63 | 4.0 |
| Exam. 8 | 6.5 | 420 | Exam. 18 | 90 | 5.0 | 0.74 | 1.61 | 4.5 |
| Exam. 9 | 6.0 | 650 | Exam. 19 | 93 | 5.0 | 0.68 | 1.75 | 5.0 |
| Exam. 10 | 5.8 | 910 | Exam. 20 | 95 | 5.0 | 0.67 | 1.78 | 5.0 |
| Comp. 1 | — | 400 | Comp. 8 | 90 | 5.0 | 0.79 | 1.51 | 3.0 |
| Comp. 2 | — | 410 | Comp. 9 | 88 | 5.0 | 0.77 | 1.55 | 3.0 |
| Comp. 3 | 2.3 | 420 | Comp. 10 | 89 | 4.0 | 0.79 | 1.51 | 3.0 |
| Comp. 4 | 11.2 | 440 | Comp. 11 | 85 | 4.0 | 0.72 | 1.65 | 3.0 |
| Comp. 5 | 6.2 | 450 | Comp. 12 | 87 | 5.0 | 0.79 | 1.51 | 3.5 |
| Comp. 6 | 6.4 | 400 | Comp. 13 | 92 | 4.0 | 0.73 | 1.63 | 3.0 |
| Comp. 7 | — | 400 | Comp. 14 | 98 | 4.0 | 0.82 | 1.45 | 4.0 |

Exam.: Example,
Comp.: Comparative Example,
WAMW: weight average molecular weight absence of a crosslinking agent such as allyl methacrylate, produced a foamed product with low expansion ratio.

The vinyl chloride resins of Examples 19 and 20 prepared using the acrylic copolymers of Examples 9 and 10 exhibited an increased melt strength due to the high molecular weight of the acrylic copolymers, resulting in uniform foamed cells.

From the above Examples and Comparative Examples, it can be seen that when an acrylic copolymer contains a crosslinked polymer with a predetermined swelling degree and has a high molecular weight, foaming property is enhanced. This is because the vinyl chloride resins of Examples have good melt strength and die swell property, thereby ensuring a low foam density and uniform foamed cells, as compared to those of Comparative Examples.

Examples 21-26 and Comparative Examples 15-17

Preparation of Vinyl Chloride Resins with Good Impact Strength Using Acrylic Copolymers Example 21

(1) Preparation of Acrylic Impact Modifier 415.8 g of ion exchange water was added to a reactor which was then heated to 78° C. with nitrogen washing. When the ion exchange water reached 78° C., 43.56 g of butyl acrylate, 0.72 g of 1,3-butanediol diacrylate, 0.72 g of methacrylic acid, and 24.21 g of 8% potassium salt solution of fatty acid were at a time added to the reactor. While the internal temperature of the reactor was maintained at 78° C., a seed reaction was carried out by addition of 12.6 g of 3% potassium persulfate solution to prepare a rubber latex. The nitrogen washing was continued until the seed reaction was terminated.

276.45 g of the rubber latex prepared by the seed reaction and 9.37 g of 8% potassium salt solution of fatty acid were sequentially added to a reactor which was then heated to 78° C. with nitrogen washing and stirred at 15° C. to obtain a pre-emulsion. Then, a mixture of 180.3 g of ion exchange water, 288.9 g of butyl acrylate, 0.35 g of 1,3-butanediol diacrylate, 0.75 g of allyl methacrylate, 34.67 g of 8% potassium salt solution of fatty acid, and 8.33 g of 3% potassium persulfate solution was added to the reactor to perform a primary core reaction. The reactor was maintained at 78° C. and the nitrogen washing was continued until the core reaction was terminated.

A mixture of 59.2 g of ion exchange water, 109.2 g of butyl acrylate, 0.15 g of 1,3-butanediol diacrylate, 0.65 g of allyl methacrylate, 15.62 g of 8% potassium salt solution of fatty acid, and 6.67 g of 3% potassium persulfate solution was stirred to obtain a pre-emulsion. The pre-emulsion was added to the reactor containing a product of the primary core reaction using a pump for one hour to perform a secondary core reaction and then incubated for one hour. The reactor was maintained at 78° C. and nitrogen washing was continued until the secondary core reaction was terminated.

A mixture of 97.4 g of ion exchange water, 71.25 g of methyl methacrylate, 3.75 g of ethyl acrylate, 2.8 g of acrylonitrile, 9.37 g of 8% potassium salt solution of fatty acid, and 6.33 g of 3% potassium persulfate solution was sufficiently stirred to obtain a pre-emulsion. The pre-emulsion was added to the reactor for 1.5 hours to perform a shell reaction, and then incubated for one hour. The reactor was maintained at 78° C. and nitrogen washing was continued until the shell reaction was terminated. As a result, a latex acrylic impact modifier was obtained. The latex acrylic impact modifier was subjected to coagulation with calcium chloride, dehydration, and drying, to give a powdery acrylic impact modifier.

(2) Preparation of Mixture of Impact Modifier and Acrylic Copolymer 90 g of the powdery acrylic impact modifier prepared in Section (1) and 10 g of the powdery acrylic copolymer prepared in Example 4 were mixed by a Henschel mixer with heating to 100° C. to prepare a mixture of the impact modifier and the acrylic copolymer.

(3) Preparation of Vinyl Chloride Resin Modified by Impact Modifier and Acrylic Copolymer 100 g of a vinyl chloride resin (LS-100, LG Chemical Co., Ltd.), 2.0 g of a tin-based thermal stabilizer, BT-107, 1.2 g of calcium stearate (Ca—St), 1.0 g of polyethylene wax (PE Wax), 1.5 g of a processing aid (PA822, LG Chemical Co., Ltd.), 14 g of a filler ($CaCO_3$), and 6 g of the mixture of the impact modifier and the acrylic copolymer prepared in Section (2) were mixed by a Henschel mixer with heating to 115° C. to give a modified vinyl chloride resin.

(4) Measurement of Extrusion Output of Vinyl Chloride Resin Modified by Impact Modifier and Acrylic Copolymer The vinyl chloride resin prepared in Section (3) was extruded by a twin screw extruder under processing temperature conditions of 170° C., 180° C., 185° C., and 190° C. A hot extrudate drawn away from a capillary die exit with diameter of 0.635 cm was cut into length of 0.8 cm to obtain extrudate pieces. The weights of three collections of the extrudate pieces were measured and averaged (?). The result is presented in Table 3 below.

(5) Charpy Impact Strength Test of Vinyl Chloride Resin Modified by Impact Modifier and Acrylic Copolymer The vinyl chloride resin prepared in Section (3) was milled by 2-roll mill at 190° C. for 7 minutes to obtain 0.6 mm sheets. The sheets were cut into size of 150 mm×200 mm and laminated in a predetermined milling direction on molds of 3 mm×170 mm×220 mm. The resultant laminates were preheated by a 195° C. heating press for 8 minutes (0.5 kg), pressed for 2 minutes (10 kg), and cooled for 3 minutes (10 kg) to obtain 3 mm-thickness specimens. The impact strength of the specimens was measured at 23° C. and −10° C. according to ASTM D-256 standard and the result is presented in Table 3 below.

(6) Measurement of Melt Time of Vinyl Chloride Resin Modified by Impact Modifier and Acrylic Copolymer The melt time of the vinyl chloride resin of Section (3) was measured in the same manner as in Example 11 and the result is presented in Table 3 below.

Example 22

A vinyl chloride resin was prepared in the same manner as in Example 21 except that 85 g of the powdery acrylic impact modifier prepared in Section (1) of Example 21 and 15 g of the powdery acrylic copolymer prepared in Example 4 were used. The extrusion output, impact strength, and melt time of the vinyl chloride resin were measured and the results are presented in Table 3 below.

Example 23

A vinyl chloride resin was prepared in the same manner as in Example 21 except that 80 g of the powdery acrylic impact modifier prepared in Section (1) of Example 21 and 20 g of the powdery acrylic copolymer prepared in Example 4 were used. The extrusion output, impact strength, and melt time of the vinyl chloride resin were measured and the results are presented in Table 3 below.

Example 24

A vinyl chloride resin was prepared in the same manner as in Example 21 except that 208.40 g of the latex acrylic impact modifier prepared in Section (1) of Example 21 and 23.61 g of the latex acrylic copolymer prepared in Example 4 were mixed followed by coagulation with calcium chloride, dehydration, and drying. The extrusion output, impact strength, and melt time of the vinyl chloride resin were measured and the results are presented in Table 3 below.

Comparative Example 15

A vinyl chloride resin was prepared in the same manner as in Example 21 except that 95 g of the powdery acrylic impact modifier prepared in Section (1) of Example 21 and 5 g of the powdery acrylic copolymer prepared in Example 4 were used. The extrusion output, impact strength, and melt time of the modified vinyl chloride resin were measured and the results are presented in Table 3 below.

Comparative Example 16

A vinyl chloride resin was prepared in the same manner as in Example 21 except that 70 g of the powdery acrylic impact modifier prepared in Section (1) of Example 21 and 30 g of the powdery acrylic copolymer prepared in Example 4 were used. The extrusion output, impact strength, and melt time of the vinyl chloride resin were measured and the results are presented in Table 3 below.

Comparative Example 17

A vinyl chloride resin was prepared in the same manner as in Example 21 except that 100 g of the powdery acrylic impact modifier prepared in Section (1) of Example 21 was used in the absence of the acrylic copolymer prepared in Example 4. The extrusion output, impact strength, and melt time of the vinyl chloride resin were measured and the results are presented in Table 3 below.

TABLE 3

| | Section | Phase of acrylic copolymer and impact modifier mixture | Acrylic copolymer (wt %) | Impact modifier (wt %) | Extrusion output (g) | Impact strength (kqcm/cm) 23° C. | Impact strength (kqcm/cm) −10° C. | Melt time (sec.) |
|---|---|---|---|---|---|---|---|---|
| Example | 21 | Powder | 10 | 90 | 1.07 | 26.8 | 8.1 | 102 |
| | 22 | Powder | 15 | 85 | 1.09 | 27.5 | 8.3 | 94 |
| | 23 | Powder | 20 | 80 | 1.15 | 29.1 | 8.6 | 90 |
| | 24 | Latex | 10 | 90 | 1.05 | 27.1 | 8.2 | 105 |
| | 25 | Latex | 15 | 85 | 1.07 | 28.3 | 8.5 | 89 |
| | 26 | Latex | 20 | 80 | 1.12 | 28.9 | 8.7 | 90 |
| Comparative Example | 15 | Powder | 5 | 95 | 1.02 | 22.4 | 6.9 | 110 |
| | 16 | Powder | 30 | 70 | 1.17 | 21.9 | 7.1 | 76 |
| | 17 | Powder | — | 100 | 0.95 | 22.4 | 7.6 | 121 |

Example 25

A vinyl chloride resin was prepared in the same manner as in Example 21 except that 196.82 g of the latex acrylic impact modifier prepared in Section (1) of Example 21 and 35.41 g of the latex acrylic copolymer prepared in Example 4 were mixed followed by coagulation with calcium chloride, dehydration, and drying. The extrusion output, impact strength, and melt time of the vinyl chloride resin were measured and the results are presented in Table 3 below.

Example 26

A vinyl chloride resin was prepared in the same manner as in Example 21 except that 185.25 g of the latex acrylic impact modifier prepared in Section (1) of Example 21 and 47.22 g of the latex acrylic copolymer prepared in Example 4 were mixed followed by coagulation with calcium chloride, dehydration, and drying. The extrusion output, impact strength, As shown in Table 3, the vinyl chloride resins of Examples 21-26 prepared using a mixture comprising 5-30 wt % of an acrylic copolymer prepared according to the present invention and 70-95 wt % of an impact modifier exhibited excellent impact strength and processability, regardless of whether the impact modifier and the acrylic copolymer were mixed in a powder or latex phase. Here, the processability was evaluated by the extrusion output and the melt time. As the extrusion output increases, the processability increases. The melt time may vary according to used conditions. However, in view of foaming conditions, the melt time is preferably in a range of 80-110 seconds, and optimally 90 seconds. In this regard, the vinyl chloride resin of Comparative Example 15, in which 95 parts by weight of the impact modifier and 5 parts by weight of the acrylic copolymer were used, did not sufficiently exhibit the processability of the acrylic copolymer, thereby lowering the processability of the vinyl chloride resin. The vinyl chloride resin of Comparative Example 16, in which 70 parts by weight of the impact modifier and 30 parts by weight of the acrylic copolymer were used, exhibited a low impact strength due to a counteractive effect of the acrylic copolymer on the impact modifier. The vinyl chloride resin of Comparative Example 17, in which only the impact modifier was used, exhibited very long melt time and poor processablity that induces a non-uniform formed product, and low impact strength.

INDUSTRIAL APPLICABILITY

As apparent from the above description, when an acrylic copolymer prepared by the method of the present invention is added to a vinyl chloride resin composition in a predetermined amount, the processability of the vinyl chloride resin can be enhanced, resulting in an excellent foamed product. Combination of the acrylic copolymer with an impact modifier can further enhance the impact strength of the vinyl chloride resin.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An acrylic copolymer composition comprising:
an alkyl acrylate crosslinked polymer formed by the polymerization of 5-15 weight % of a crosslinking agent and alkyl acrylate monomer; and
a non-crosslinked copolymer formed by the polymerization of 55-90 weight % of methyl methacrylate with 5-40 weight % of at least one monomer selected from the group consisting of alkyl acrylate compounds and alkyl methacrylate compounds,
wherein the weights are based on the whole weight of the crosslinking agent and the monomer components, wherein the non-crosslinked copolymer has a weight average molecular weight of 4,100,00 to 9,100,000; and
wherein the acrylic copolymer composition is prepared by a method of emulsion polymerization comprises:
(a) (i) mixing 5-15 wt % of the crosslinking agent and the alkyl acrylate monomer to prepare an emulsion containing the alkyl acrylate crosslinked polymer having the degree of swelling of 3 to 10 in tetrahydrofuran and then adding 27.5-45 wt % of the methyl methacrylate, 2.5-20 wt % of the at least one monomer selected from the group consisting of the alkyl acrylate compound with an alkyl group of 1-18 carbon atoms and the alkyl methacrylate compound with an alkyl group of 2-18 carbon atoms, an emulsifier, a polymerization initiator, and a redox catalyst, to the emulsion containing the alkyl acrylate crosslinked polymer or (ii) mixing 27.5-45 wt % of the methyl methacrylate, 2.5-20 wt % of the at least one monomer selected from the group consisting of the alkyl acrylate compound with an alkyl group of 1-18 carbon atoms and the alkyl methacrylate compound with an alkyl group of 2-18 carbon atoms, an emulsifier, a polymerization initiator, and a redox catalyst to polymerize the monomers and then adding 5-15 wt % of the crosslinking agent and the alkyl acrylate monomer to the mixture; and
(b) further adding 27.5-45 wt % of the methyl methacrylate, 2.5-20 wt % of the at least one monomer selected from the group consisting of the alkyl acrylate compound with an alkyl group of 1-18 carbon atoms and the alkyl methacrylate compound with an alkyl group of 2-18 carbon atoms, an emulsifier, a polymerization initiator, and a redox catalyst, to the resultant mixture of step (a).

2. The acrylic copolymer composition of claim 1, wherein the crosslinking agent is selected from the group consisting of allyl methacrylate, trimethylolpropane triacrylate, and divinylbenzene.

3. The acrylic copolymer composition of claim 1, wherein the alkyl acrylate compound for the crosslinked polymer has a straight, branched, or cyclic alkyl group of 1-18 carbon atoms.

4. The acrylic copolymer composition of claim 1, wherein the alkyl acrylate compound for the crosslinked polymer is one or more selected from the group consisting of methyl acrylate, ethyl acrylate, n-butyl acrylate, lauryl acrylate, stearyl acrylate, 2-ethylhexyl acrylate, and cyclohexyl acrylate.

5. The acrylic copolymer composition of claim 1, wherein the alkyl acrylate compound for the non-crosslinked copolymer has a straight, branched, or cyclic alkyl group of 1-18 carbon atoms and the alkyl methacrylate compound for the non-crosslinked copolymer has a straight or cyclic alkyl group of 2-18 carbon atoms.

6. The acrylic copolymer composition of claim 1, wherein the alkyl acrylate compound for the non-crosslinked copolymer is one or more selected from the group consisting of methyl acrylate, ethyl acrylate, n-butyl acrylate, lauryl acrylate, stearyl acrylate, 2-ethylhexyl acrylate and cyclohexyl acrylate, and the alkyl methacrylate compound for the non-crosslinked copolymer is one or more selected from the group consisting of n-butyl methacrylate, lauryl methacrylate, stearyl methacrylate, tridecyl methacrylate, i-butyl methacrylate, t-butyl methacrylate, 2-ethylhexyl methacrylate and cyclohexyl methacrylate.

7. A method for preparing the acrylic copolymer composition of claim 1 by emulsion polymerization, which comprises the steps of:
(a) (i) mixing 5-15 wt % of the crosslinking agent and the alkyl acrylate monomer to prepare an emulsion containing the alkyl acrylate crosslinked polymer having the degree of swelling of 3 to 10 in tetrahydrofuran and then adding 27.5-45 wt % of the methyl methacrylate, 2.5-20 wt % of the at least one monomer selected from the group consisting of the alkyl acrylate compound with an alkyl group of 1-18 carbon atoms and the alkyl methacrylate compound with an alkyl group of 2-18 carbon atoms, an emulsifier, a polymerization initiator, and a redox catalyst, to the emulsion containing the alkyl acrylate crosslinked polymer or (ii) mixing 27.5-45 wt % of the methyl methacrylate, 2.5-20 wt % of the at least one monomer selected from the group consisting of the alkyl acrylate compound with an alkyl group of 1-18 carbon atoms and the alkyl methacrylate compound with an alkyl group of 2-18 carbon atoms, an emulsifier, a polymerization initiator, and a redox catalyst to polymerize the monomers and then adding 5-15 wt % of the crosslinking agent and the alkyl acrylate monomer to the mixture; and
(b) further adding 27.5-45 wt % of the methyl methacrylate, 2.5-20 wt % of the at least one monomer selected from the group consisting of the alkyl acrylate compound with an alkyl group of 1-18 carbon atoms and the alkyl methacrylate compound with an alkyl group of 2-18 carbon atoms, an emulsifier, a polymerization initiator, and a redox catalyst, to the resultant mixture of step (a), wherein the weights are based on the whole weight of the crosslinking agent and the monomer components.

8. A vinyl chloride resin composition comprising a vinyl chloride resin and 0.1-20 parts by weight of an acrylic copolymer composition prepared according to the method of claim 7, based on the 100 parts by weight of the vinyl chloride resin.

9. A vinyl chloride resin composition including a vinyl chloride resin and 1-30 parts by weight of a mixture comprising 5-30 wt % of an acrylic copolymer composition prepared according to the method of claim 7 and 70-95 wt % of an impact modifier, based on 100 parts by weight of the vinyl chloride resin.

10. The vinyl chloride resin composition of claim 9, wherein the impact modifier is selected from the group consisting of acrylonitrile-butadiene-styrene (ABS), methyl methacrylate-butadiene-styrene (MBS), and acrylic compounds.

* * * * *